(12) United States Patent
Choe et al.

(10) Patent No.: US 7,698,172 B2
(45) Date of Patent: Apr. 13, 2010

(54) METHODS FOR RUNNING AN ON-LINE SHOPPING MALL WITH UPDATED PRICE NOTIFICATION

(75) Inventors: Jeong Ok Choe, Seoul (KR); Young Woon Yoon, Seoul (KR)

(73) Assignee: NHN Corporation, Seongnam-Si, Kyunggi-Do (KR)

( * ) Notice: Subject to any disclaimer, the term of this patent is extended or adjusted under 35 U.S.C. 154(b) by 0 days.

(21) Appl. No.: 11/858,039

(22) Filed: Sep. 19, 2007

(65) Prior Publication Data

US 2008/0004987 A1   Jan. 3, 2008

Related U.S. Application Data

(63) Continuation of application No. PCT/KR2006/001047, filed on Mar. 22, 2006.

(30) Foreign Application Priority Data

Mar. 22, 2005   (KR) .................. 10-2005-0023501

(51) Int. Cl.
*G06Q 30/00* (2006.01)
*G06F 17/30* (2006.01)
(52) U.S. Cl. .......................... 705/26; 705/27
(58) Field of Classification Search .......... 705/1, 705/26–27, 80
See application file for complete search history.

(56) References Cited

U.S. PATENT DOCUMENTS 6,405,175 B1 *  6/2002  Ng ........................... 705/14
7,069,233 B2 *  6/2006  Bracken et al. ............. 705/10
7,099,833 B1 *  8/2006  Sundaresan ................. 705/26
2001/0032164 A1 * 10/2001  Kim .......................... 705/37
2001/0049636 A1 * 12/2001  Hudda et al. ............... 705/26

(Continued)

FOREIGN PATENT DOCUMENTS

KR   10-2000-0024298 A   5/2000

(Continued)

OTHER PUBLICATIONS

"Smart Media: Smart Media launches e-retailer total ecommerce solution". M2 Presswire, Page: NA, May 26, 1999 [recovered from Dialog database on Mar. 11, 2009].*

(Continued)

*Primary Examiner*—Jeffrey A. Smith
*Assistant Examiner*—William J. Allen
(74) *Attorney, Agent, or Firm*—Knobbe, Martens, Olson & Bear LLP

(57) ABSTRACT

A method of providing price information of goods includes maintaining a database recording user information associated with a user, a product identifier, and desired price information, the user information including a user identifier and a mobile phone number or an electronic mail address associated with the user identifier. The method further includes receiving a selection of a product and desired price information for the product from the user, and recording the product identifier and the desired price information of the product in the database, in association with the user information of the user. The method further includes receiving selling price information of the product associated with the product identifier from at least one seller, and notifying the user of predetermined information when the received selling price satisfies a predetermined criterion.

13 Claims, 8 Drawing Sheets

| USER IDENTIFIER 301 | GOODS IDENTIFIER 302 | DESIRED PRICE 303 | MOBILE PHONE NO 304 | EMAIL ADDRESS 305 |
|---|---|---|---|---|
| suezo00 | COOLPIX 4100 | 370,000 | 01198271025 | hjy00@nate.com |
| siroe23 | COOLPIX 4100 | 365,000 | 01012345678 | skh77@hotmail.com |
| lucky77 | DSC-W1 | 290,000 | 0194567821 | jhp01@hotmail.com |
| mingming | iPod Mini | 225,000 | 0164782011 | pdg05@nate.com |
| tamajjang | iFP-799(1G) | 251,000 | 0177896325 | jel78@nate.com |
| ... | ... | ... | ... | ... |

300

U.S. PATENT DOCUMENTS

2002/0143664 A1* 10/2002 Webb .......................... 705/27
2004/0220884 A1* 11/2004 Khan .......................... 705/80
2005/0160014 A1* 7/2005 Moss et al. .................. 705/26

FOREIGN PATENT DOCUMENTS

| KR | 20-2001-0000818 A | 1/2001 |
| KR | 10-2001-0081234 A | 8/2001 |
| KR | 10-2003-0061019 A | 7/2003 |
| KR | 10-2006-0010684 A | 2/2006 |

OTHER PUBLICATIONS

International Search Report regarding PCT Application No. PCT/KR2006/001047 dated Apr. 28, 2006.

Office Action to KR Counterpart Patent Application 10-2005-0023501 dated May 19, 2006.

Written Opinion regarding PCT Application No. PCT/KR2006/001047 dated Apr. 28, 2006.

* cited by examiner

FIG. 3

| USER IDENTIFIER 301 | GOODS IDENTIFIER 302 | DESIRED PRICE 303 | MOBILE PHONE NO 304 | EMAIL ADDRESS 305 |
|---|---|---|---|---|
| suezo00 | COOLPIX 4100 | 370,000 | 0198271025 | hjy00@nate.com |
| siroe23 | COOLPIX 4100 | 365,000 | 01012345678 | skh77@hotmail.com |
| lucky77 | DSC-W1 | 290,000 | 0194567821 | jhp01@hotmail.com |
| mingming | iPod Mini | 225,000 | 0164782011 | pdg05@nate.com |
| tamajjang | iFP-799(1G) | 251,000 | 0177896325 | jel78@nate.com |
| ... | ... | ... | ... | ... |

A LIST OF USERS WHO SEARCHED FOR "COOLPIX 4100"

☐ ORDER OF LOWER PRICE  ■ ORDER OF HIGHER PRICE
☐ ORDER OF REGISTRATION DATE

| USER ID | DESIRED PRICE | REGISTRATION DATE | APPROVAL SELECTION |
|---------|---------------|-------------------|--------------------|
| kitten11 | 375,000 | 05/03/01 | APPROVAL |
| doobob | 372,000 | 05/03/02 | APPROVAL |
| suezo00 | 370,000 | 05/03/01 | APPROVAL |
| sorie23 | 365,000 | 05/02/28 | APPROVAL |
| ping791 | 363,000 | 05/03/03 | APPROVAL |
| cooroi99 | 358,000 | 05/03/07 | APPROVAL |

METHODS FOR RUNNING AN ON-LINE SHOPPING MALL WITH UPDATED PRICE NOTIFICATION

CROSS-REFERENCE TO RELATED PATENT APPLICATIONS

This application is a continuation application under 35 U.S.C. §365(c) of International Application No. PCT/KR2006/001047, filed Mar. 22, 2006 designating the United States. International Application No. PCT/KR2006/001047 was published in English as WO2006/101349 A1 on Sep. 28, 2006. This application further claims the benefit of the earlier filing dates under 35 U.S.C. §365(b) of Korean Patent Application No. 10-2005-0023501 filed Mar. 22, 2005. This application incorporates herein by reference the International Application No. PCT/KR2006/001047 including the International Publication No. WO2006/101349 A1 and the Korean Patent Application No. 10-2005-0023501 in their entirety.

BACKGROUND

1. Field

The present disclosure relates to a method of providing information of goods via the Internet, and more particularly, facilitating purchase transactions at user's desired prices.

2. Discussion of the Related Technology

As a large number of people utilize the Internet, various kinds of services using the Internet are provided. Accordingly, Internet users may utilize various on-line services, e.g. shopping, playing games, watching movies, and listening to music. In particular, in the case of on-line shopping, since people may purchase goods without visiting stores in person, a large number of Internet users are enjoying Internet shopping. Also, shopping mall relay services of providing sales information including prices on goods which are being sold in a plurality of on-line stores or shopping malls are also increasing.

When a selling price or retailer price for a product changes, an on-line shopping mall or a shopping mall relay system typically displays the changed selling price only on a predetermined webpage. Accordingly, a user needs to search for price changes of goods or services that the user desires to purchase, so as to check the price change information of the goods. Also, the user must access a corresponding shopping or shopping mall relay system so as to check the price information of the goods. Thus, it is not easy for a user to obtain necessary information when purchasing goods.

The foregoing discussion is to provide general background information, and does not constitute an admission of prior art.

SUMMARY

One aspect of the invention provides a method of running an on-line shopping mall, which comprises: transmitting, to a terminal associated with a user, at least one price of a product available from at least one retailer associated with an on-line shopping mall; receiving a desired price of the product from the terminal; obtaining an updated price of the product from a first retailer associated with the on-line shopping mall; comparing the updated price of the first retailer against the desired price; and sending a notification to the user if the updated price is equal to or lower than the desired price.

In the foregoing method, the method may further comprising: prior to transmitting, receiving a request from the user for providing sales information of the product available in the on-line shopping mall; and prior to transmitting, searching for sales information of the product available in the on-line shopping mall. The method may further comprises transmitting sales information of the product in addition to the at least one price of the product, wherein the sales information may be selected from the group consisting of a brand name of the product, a picture of the product and an online store selling the product. The notification may provide a link configured to open a web page of the first retailer. The notification may provide the updated price. The notification may be sent to an email address of the user. The notification may be sent to a mobile telephone of the user.

Still in the foregoing method, obtaining may comprise: sending a request for an updated price of the product to at least one retailer associated with the on-line shopping mall; and receiving the updated price from the first retailer. Obtaining may comprise retrieving a price of the product from the web page of the first retailer. The on-line shopping mall may comprise a shopping web page comprising at least one link configured to open at least one on-line store registered with the on-line shopping mall.

Another aspect of the invention provides a method for processing to purchase a product from an on-line shopping mall, which comprises: searching, by a user, for a desired product in an on-line shopping mall; receiving at least one retailer price of the product from the on-line shopping mall; submitting, to the on-line shopping mall, the user's desired price of the product; and receiving, from the on-line shopping mall, a notification notifying the user that an updated price is equal to or lower than the desired price.

In the foregoing method, the method may further comprise: visiting the retailer's web page; and purchasing the product from the retailer at the updated price. The notification may further provide a link configured to open a web page of a retailer who has provided the updated price. The notification may provide the updated price. Receiving the notification may be by either an email or a text message to a mobile phone of the user.

Yet another aspect of the invention provides a method of running an on-line shopping mall, which comprises: receiving a request, from a terminal associated with a user, for information of a product available from the on-line shopping mall; transmitting, to the user terminal, at least one price of the product available from at least one retailer associated with the on-line shopping mall; receiving, from the user terminal, the user's desired price of the product; sending the desired price of the user to the at least one retailer; receiving, from a terminal associated with a first retailer, a communication indicative of the first retailer's intention to sell the product at the desired price of the user; and sending, to the user terminal, a notification indicative of the first retailer's intention.

In the foregoing method, the notification may provide a link configured to open a web page of the first retailer. The method may further comprises sending user information along with the user's desired price for consideration by the at least one retailer. The method may further comprise upon receiving the request, searching for sales information of the product available in the on-line shopping mall. The method may further comprise transmitting sales information of the product in addition to the at least one price of the product, wherein the sales information may be selected from the group consisting of a brand name of the product, a picture of the product and an online store selling the product.

One aspect of the present invention provides a method and a system which can record desired prices for predetermined goods from a user, receive selling price information of the goods from a predetermined goods selling system and when the selling price information is lower than the desired price information or when the selling price information is updated to be lower, notify the user of the event.

Another aspect of the present invention provides a method and a system which can provide a user with goods information being sold at a price associated with the user's desired price information, so that the user may purchase the goods at the user's desired price.

Another aspect of the present invention provides a method and a system which can provide a user with goods price information via a short message service (SMS), an electronic mail, a messenger, and a note, and thus, help the user to easily check the goods price information.

Another aspect of the present invention provides a method and a system which can perform a mailing format conversion with respect to the webpage and thus, help the goods price information to be easily provided for the user, when providing a user with selling price information of a seller which is provided on a predetermined webpage.

Another aspect of the present invention also provides a method and a system which can help a seller to easily find a consumer by providing the seller with user information and the user's desired price information.

One aspect of the present invention provides a method of providing price information of goods, the method including the steps of: maintaining a price information database recording user information associated with a user, a goods identifier, and desired price information (the user information including a user identifier and a mobile phone number or an electronic mail address associated with the user identifier); receiving a selection on predetermined goods and desired price information associated with the goods from the user; recording the goods identifier and the desired price information of the goods in the price information database, in association with the user information of the user; receiving selling price information of the goods associated with the goods identifier from at least one goods selling system; and notifying the user of predetermined goods information when the received selling price information satisfies a predetermined criterion (the goods information including a webpage Uniform Resource Locator (URL) of the goods selling system or selling price information).

Another aspect of the present invention provides a method of providing price information of goods, the method including the steps of: maintaining a price information database recording user information associated with a user, a goods identifier, and desired price information (the user information including a user identifier and either a mobile phone number or an electronic mail address associated with the user identifier); receiving a selection on predetermined goods and desired price information associated with the goods from the user; recording the goods identifier and the desired price information of the goods in the price information database, in association with the user information of the user; receiving a search query including the goods identifier of the goods from a predetermined seller; extracting user information and desired price information associated with the received goods identifier by referring to the price information database; and making a list including the extracted user information and desired price information and providing the seller with the list.

Still another aspect of the present invention provides a system of providing price information of goods, the system including: a price information database recording user information associated with a user, a goods identifier, and desired price information (the user information including a user identifier and a mobile phone number or an electronic mail address associated with the user identifier); a desired price information receiving unit receiving a selection on predetermined goods and the desired price information associated with the goods from the user; a database updating unit recording the goods identifier and the desired price information of the goods in the price information database, in association with the user information of the user; a selling price information receiving unit receiving selling price information of the goods associated with the goods identifier from at least one goods selling system; and a notification unit notifying the user of the predetermined goods information when the received selling price information satisfies a predetermined criterion, the goods information including a webpage URL of the goods selling system or selling price information.

BRIEF DESCRIPTION OF THE DRAWINGS

FIG. 3 is a diagram illustrating a configuration of a price information database according to an embodiment of the present invention;

FIG. 6 is a diagram illustrating an example of a list including user information and selling price information which are provided for a seller or retailer according to an embodiment of the present invention;

DETAILED DESCRIPTION OF EMBODIMENTS

Hereinafter, embodiments of the present invention will be described in detail with reference to the accompanying drawings. This disclosure uses the terms "goods" "product(s)" and commodity interchangeably.

Figure 1:
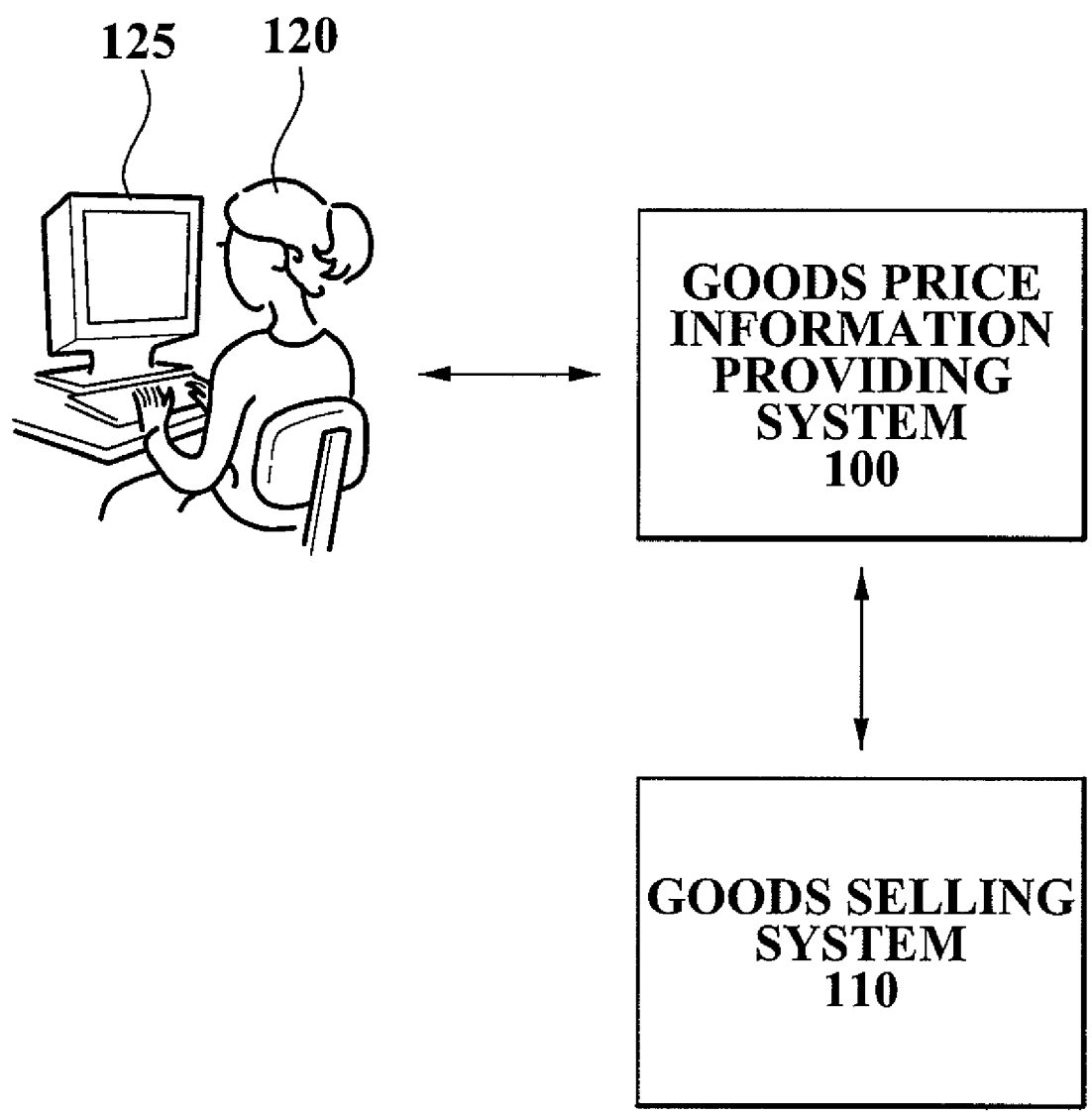
FIG. 1 is a schematic diagram illustrating a system according to an embodiment of the present invention.

FIG. 1 is a schematic diagram illustrating a system according to an embodiment of the present invention. A system 100 for providing price information or retail price information receives a selection of a product and desired price information for the product, from a user 120. The system 100 receives selling price information associated with the goods from a goods selling system 110. When the selling price information satisfies a predetermined criterion, the system 100 notifies the user 120 of the selling price information.

When a search query associated with a search for a product or a type of products is received from a seller, the system 100 extracts information for a user who has inputted desired price information for the product associated with the search query, and the desired price information, and provides the seller with the extracted user information and the desired price information.

The system 100 may interoperate with a predetermined shopping mall relay system which provides price information associated with goods that are being sold at a plurality of shopping malls or on-line stores. The goods selling system 110 may provide the system 100 with price information associated with a product. Also, the system 100 may scrap the price information from the goods selling system 110. A user terminal 125 is a device which can include computation ability by including a memory unit and a microprocessor and also can access a wired/wireless communication network, such as a desktop personal computer (PC), a notebook PC, a personal digital assistant (PDA), a mobile terminal, etc.

Figure 2:
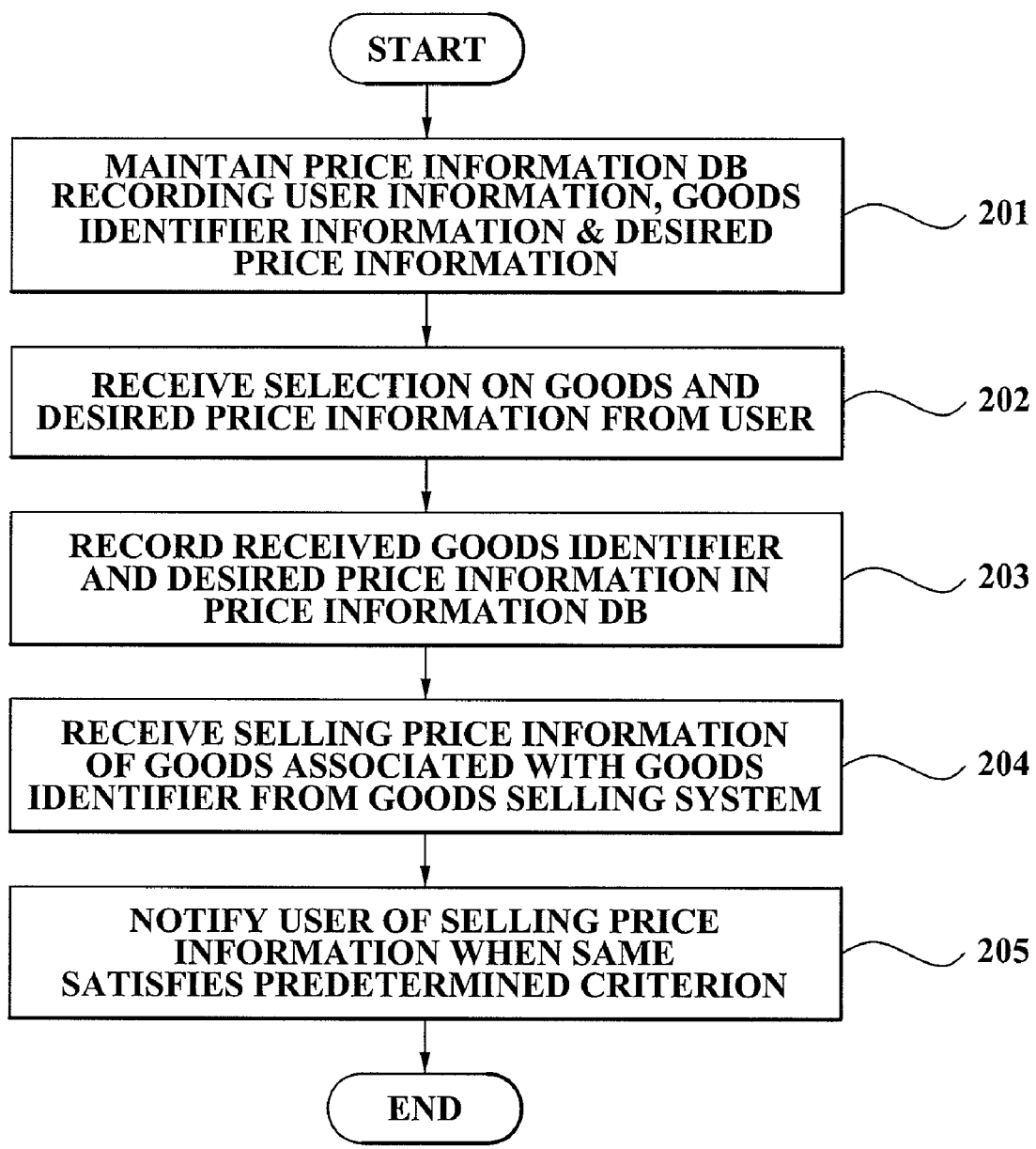
FIG. 2 is a flowchart illustrating a method according to an embodiment of the present invention.

FIG. 2 is a flowchart illustrating a method according to an embodiment of the present invention. The method according to an embodiment may be performed by the system 100. In step 201, the system 100 maintains a price information database. The price information database records user information associated with a user, a product identifier, and desired price information. In this instance, the user information may include a user identifier and a mobile phone number or an electronic mail or email address associated with the user identifier. The price information database will be described in detail with reference to FIG. 3.

FIG. 3 is a diagram illustrating a configuration of a price information database according to an embodiment of the present invention. As shown in FIG. 3, a price information database 300 may include a user identifier 301, a product identifier 302, a desired price 303, a mobile phone number 304, and an electronic mail address 305. The user identifier 301 is information for identifying a user. A user name or ID may be utilized for the user identifier 301. The product identifier 302 is information for identifying a product that is selected by a user associated with the user identifier 301. Product model information may be utilized for the product identifier 302. The desired price 303 is a user's desired price with respect to the product associated with the product identifier 302, and may be directly inputted from the user.

The mobile phone number 304 and the electronic mail address 305 are user information associated with the user identifier 301, and may be utilized when notifying a user that a selling price of a product received from a predetermined goods selling system is lower than the desired price 303 or the selling price of the goods is updated to be lower. Also, the mobile phone number 304 and the electronic mail address 305 may be directly received from the user or extracted from a predetermined user information database recording the user information.

In step 202 of FIG. 2, the system 100 receives a selection of a product and desired price information associated with the product from the user. The user may search for the product and select the user's desired product by referring to product information that is provided as search results. Also, when selecting the product, the user may input his/her desired price information in association with the product. When the user searches for a "digital camera", information for at least a product included in the "digital camera" is provided for the user. The user may select a product by clicking the same that the user desires to purchase via a mouse or directly inputting a product identifier for the product. When selecting the product, the user may directly input the desired price information of the product using a predetermined input device of a user terminal.

In step 203, the system 100 records the received product identifier and the desired price information for the product in the price information database, in association with the user information of the user. When a user completes a selection of a product and an input of desired price information for the product, a identifier for the product and desired price information of the selected product may be recorded in the price information database in association with a user identifier of the user. As an example, when a product whose the identifier is "COOLPIX 4100" is selected by a user whose the user identifier is "suezo00" and a desired price "370,000 Korean won" is inputted from the user, "suezo00-COOLPIX 4100—37,000" may be recorded in the price information database. Also, when the user's mobile phone number or electronic mail address is further inputted by the user, the mobile phone number or electronic mail address may also be recorded in the price information database.

In step 204, the system 100 receives selling price information of the product associated with the product identifier from at least one goods selling system. The selling price information may include a retailer price. Also, the selling price information may be periodically (e.g. every day) received or be not-periodically received from the goods selling system.

Also, the system 100 may access the at least one goods selling system or server and obtain the selling price information of the product associated with the product identifier. As an example, the system 100 may directly access a predetermined shopping mall server and obtain the selling price information of the product associated with the product identifier in the shopping mall server using web-scraping or the like.

In step 205, the system 100 notifies the user of predetermined goods information or notification when the received selling price information satisfies a predetermined criterion. The goods information includes a URL of the goods selling system or selling price information. Also, the predetermined criterion may be the condition that the selling price is lower than the desired price or that the selling price is updated to be lower than previously received selling price.

When notifying the user of the price information or notification associated with the selling price information, the selling price information may be provided by finding the user's mobile phone number or electronic mail address with reference to the price information database and using an SMS (Short Message Service or text messaging) or an e-mail. Also, when the user is approved by the system 100, the selling price information may be notified to the user via a predetermined messenger or a note which is provided from the system 100. Also, the selling price information may be notified to the user by using all of the SMS, the e-mail, the messenger and the note. Hereinafter, a method of providing price information via an electronic mail according to an embodiment of the present invention will be described in detail with reference to FIG. 4.

Figure 4:
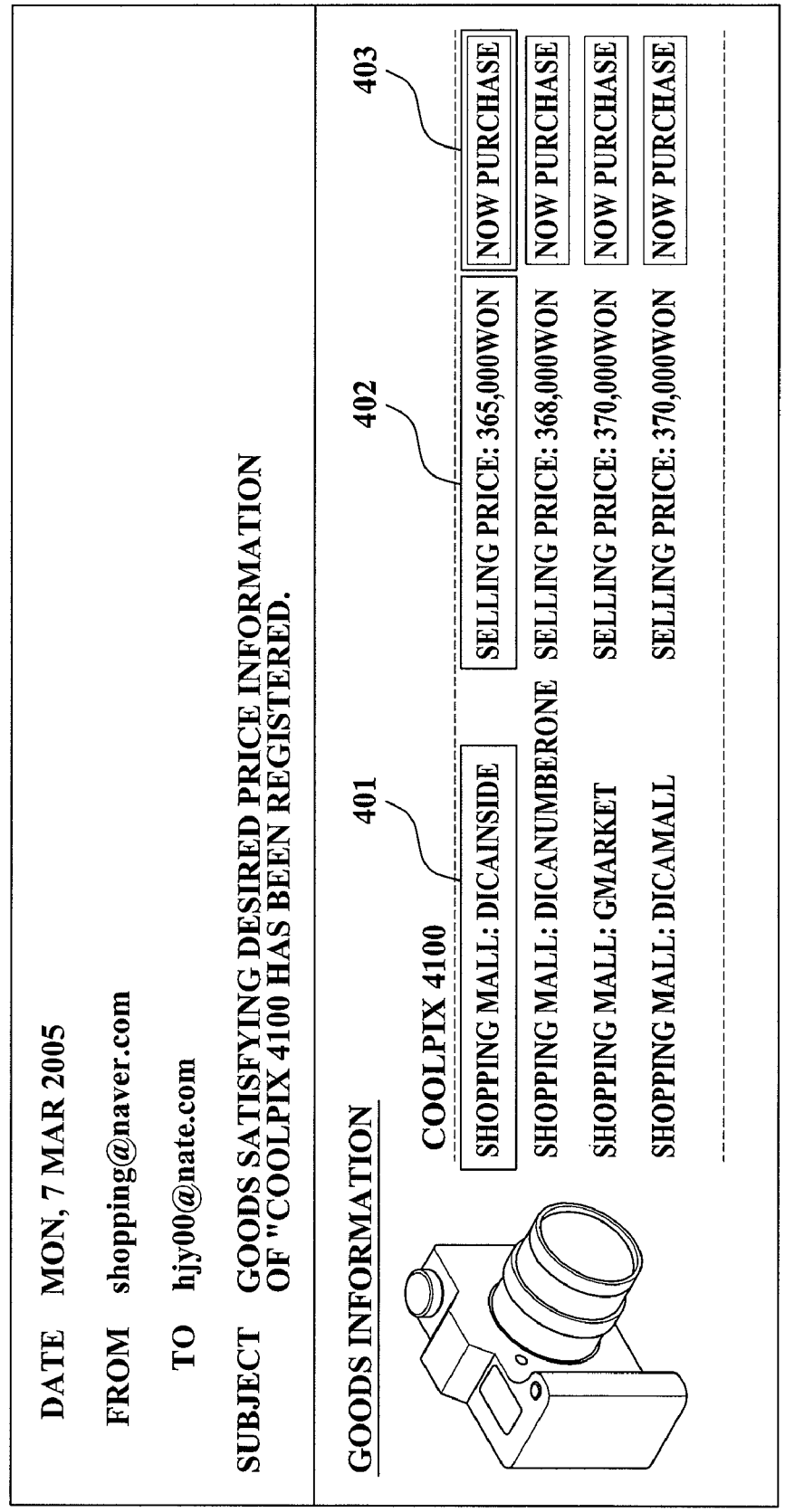
FIG. 4 is a diagram illustrating an example of a screen providing a user with goods price information via an electronic mail according to an embodiment of the present invention.

FIG. 4 is a diagram illustrating an example of a screen providing a user with price information via an electronic mail according to an embodiment of the present invention. As shown in FIG. 4, when selling price information of a product received from a goods selling system satisfies a user's desired price information, information including the selling price information of the product sellers may be notified to the user via the user's email. As an example, when a user whose user identifier is "suezo00" inputs a desired price "370,000 Korean won" with respect to the product whose the identifier is "COOLPIX 4100", the user may be notified with selling price information of a product retailer whose selling price information is identical to "370,000 Korean won" from selling price information associated with the identifier "COOLPIX 4100" which is received from at least one goods selling system. When notifying the selling price information, the selling price information may include the name of a goods selling system 401, selling price information 402 or a predetermined connection button or link button 403 which is directly linked to the goods selling system to enable the user to directly contact and purchase the goods. Accordingly, the user may easily purchase goods by receiving an email of notifying selling price information and, via the email, accessing a goods selling system which sells the goods at the user's desired price.

When the selling price information which is received from the goods selling system is updated to be lower, the product information including the updated selling price information may be notified to the user via the email. As an example, when a goods selling system did not include goods whose product identifier was "iPod Mini" and selling price information was smaller than "225,000 Korean won", but includes the goods after updating the selling price information, the selling price information associated with the goods selling system may be provided for the user.

Also, when the selling price information is updated, a format conversion may be performed for mailing with respect to a predetermined webpage including the selling price information. The webpage may be a web document based on HyperText Markup Language (HTML). Accordingly, the updated selling price information may be easily transmitted to the user via an email by converting the webpage into the format for mailing.

Figure 5:
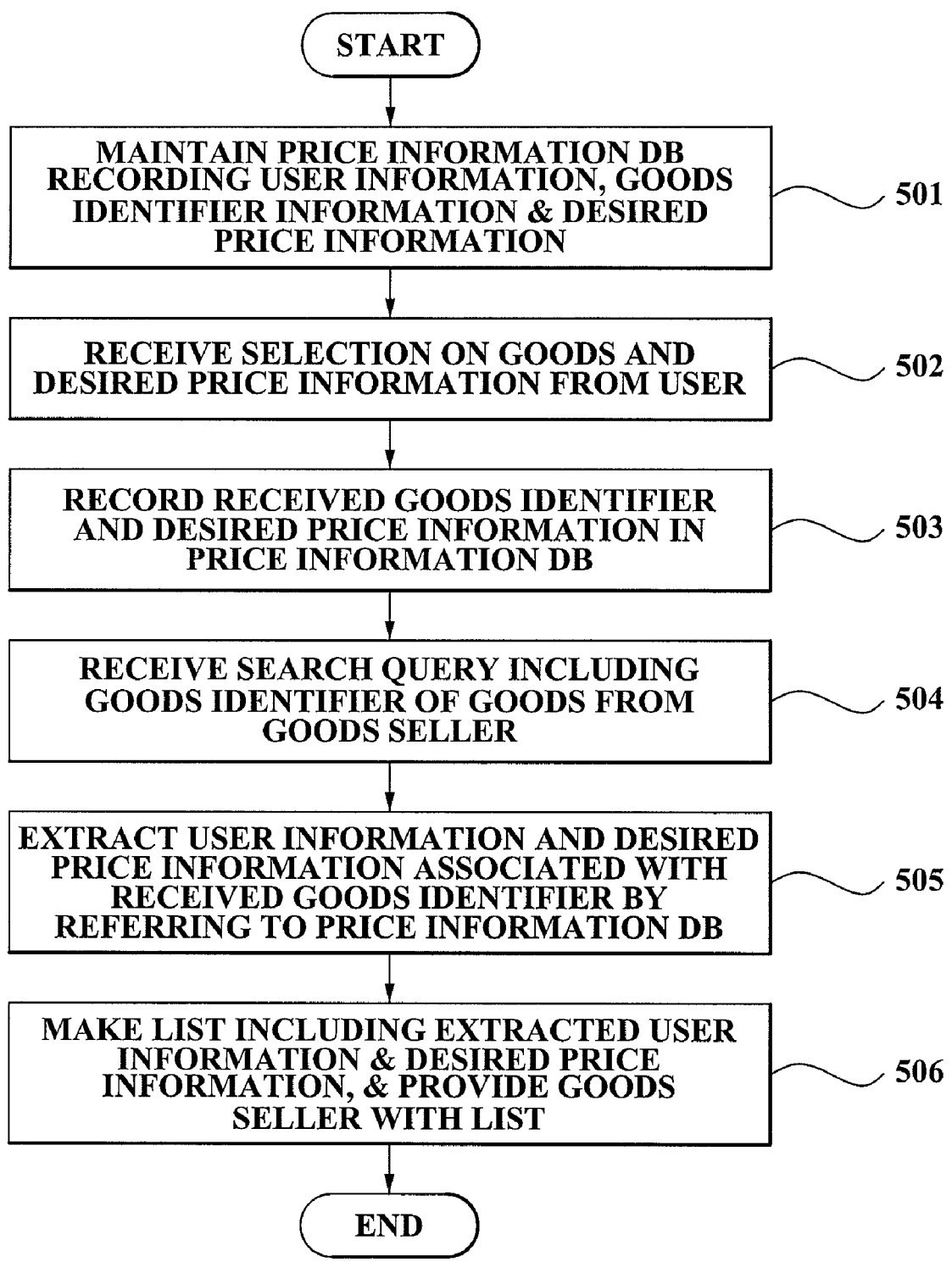
FIG. 5 is a flowchart illustrating a method according to another embodiment of the present invention.

FIG. 5 is a flowchart illustrating a method according to another embodiment of the present invention. The method according to the present embodiment may be performed by the system 100. In step 501, the system 100 maintains a price information database. The price information database records user information associated with a user, a product identifier, and desired price information. In this instance, the user information may include a user identifier and either a mobile phone number or an electronic mail address associated with the user identifier. Detailed description related to the price information database has been described with reference to FIG. 3.

In step 502, the system 100 receives a selection of a product and desired price information associated with the goods from the user. The user may search for goods and select the user's desired product by referring to sales information that is provided as search results. Also, when selecting the product, the user may input his/her desired price information in association with the product. As an example, when the user searches for an "MP3 player", information for at least one product included in the "MP3 player" is provided for the user. The user may select the product by clicking the product that the user desires to purchase via a mouse or directly inputting an identifier for the product. When selecting the product, the user may directly input the desired price information of the product using a predetermined input device of a user terminal.

In step 503, the system 100 records the received product identifier and the desired price information of the goods in the price information database in association with the user information of the user. When a user completes a selection of the product and an input of desired price information, a product identifier and desired price information of the selected goods may be recorded in the price information database in association with a user identifier of the user. Also, when the user's mobile phone number or electronic mail address is further inputted from the user, the mobile phone number or electronic mail address also may be recorded in the price information database.

In step 504, the system 100 receives a search query including an identifier of a product from a predetermined seller. The seller may input model information of the goods, i.e. a model identifier, as a search query. Namely, the seller may input a model identifier of a product, for example, "COOLPIX 4100", "iPod Mini" and "iFP-799" and search for the product corresponding to the search query.

In step 505, the system 100 extracts user information and desired price information associated with the received product identifier by referring to the price information database. As an example, referring again to FIG. 3, when the search query received from the identifier is "COOLPIX 4100", the system 100 may extract a user identifier and desired price information of the user who has inputted the goods corresponding to the product identifier "COOLPIX 4100", for example "suezo00—370,000 Korean won" and "sorie23—365,000 Korean won", by referring to the price information database.

In step 506, the system 100 makes a list including the extracted user information and desired price information and provides the seller with the list. In this instance, the list may include at least one user information and desired price information of the user for a product associated with the search query received from the seller. The list may be provided in a form of a web page. Also, the list may be provided via an email, an SMS, etc. Hereinafter, user information and desired price information to be provided for a seller will be described in detail with reference to FIG. 6.

FIG. 6 is a diagram illustrating an example of a list including user information and selling price information which are provided for a seller according to an embodiment of the present invention. As shown in FIG. 6, when a seller inputs "COOLPIX 4100" as a search query and searches for the product identifier "COOLPIX 4100", the system 100 may make a list including a user identifier and desired price information of the user related to the product identifier "COOLPIX 4100" by referring to a price information database and provide the seller with the list. In this instance, the list may include information on a user identifier, a desired price, a registration date, etc. Also, when providing the list, the system 100 may arrange the list in ascending or descending order of price according to a seller's selection, and provide the seller with the arranged list. Accordingly, the seller may easily find a user to sell goods at a selling price from the list.

Also, the system 100 may notify the user of an event that an approval associated with the desired price information is received from the seller. The seller may select a user to sell goods, by referring to the list and input an approval for the user. When the seller inputs the approval for the user, information of the seller, for example, information on a seller identifier, a goods selling website URL, and a goods selling price, may be notified to the user. In this case, an SMS, an electronic mail, a messenger, or a note may be utilized.

As an example, referring again to FIG. 6, inputting of an approval may be performed via each user and a predetermined button. When the seller selects a user to sell goods and inputs an approval associated with the user, the user may be notified of information of the seller. Generally, the seller may sell the product to the user who suggests a highest desired price. Accordingly, the seller may arrange the list in order of highest desire prices so that the seller may select the user who has inputted the highest desired price and input an approval associated with the user.

Figure 7:
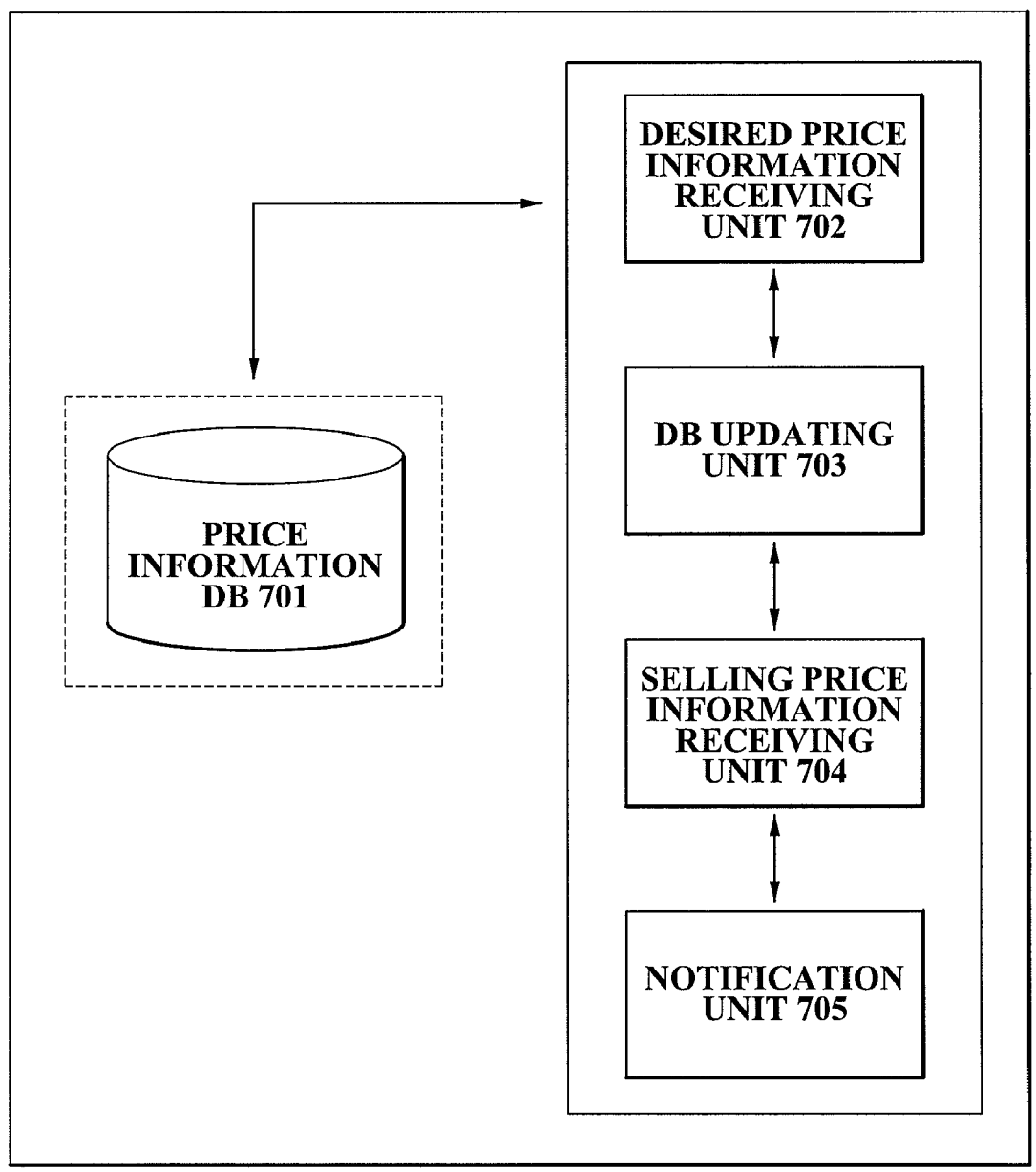
FIG. 7 is a diagram illustrating an internal configuration of a system according to an embodiment of the present invention.

Hereinafter, a system will be described with reference to FIGS. 7 and 8. FIG. 7 is a diagram illustrating an internal configuration of a system 700 according to an embodiment of the present invention. As shown in FIG. 7, the system 700 according to the present embodiment may include a price information database 701, a desired price information receiving unit 702, a database updating unit 703, a selling price information receiving unit 704 and a notification unit 705.

The price information database 701 records user information associated with a user, a product identifier, and desired price information. The user information may include a user identifier and either a mobile phone number or an electronic mail address associated with the user identifier. Also, the mobile phone number or the electronic mail address may be utilized for notifying the user of selling price information which is received from a good selling system.

The desired price information receiving unit 702 receives a selection of a product and the desired price information associated with the product from the user. When the user desires to purchase the product, the user may input a product identifier of the goods and his/her desired price information. Also, the user may directly input the product identifier and the desired price information via a user terminal.

The database updating unit 703 records the product identifier and the desired price information of the goods in the price information database 701, in association with the user information of the user.

The selling price information receiving unit 704 receives selling price information of the product associated with the product identifier from at least one goods selling system. The selling price information may be price information with which a corresponding goods selling system sells the product associated with the product identifier. Also, the selling price information may be obtained periodically (e.g. every day) or be not-periodically from the goods selling system. Also, the selling price information providing unit 704 may directly access the at least one goods selling system and obtain the selling price information. Namely, the selling price information providing unit 704 may directly access the goods selling system and collect the selling price information using a scrap.

The notification unit 705 notifies the user of predetermined goods information when the received selling price information satisfies a predetermined criterion. The predetermined criterion may be the condition that the selling price is lower than the desired price or that the selling price is updated to be lower than previously received selling price. Also, when notifying the user of selling price information, the notification unit 705 may utilize an SMS, an email, a messenger or a note.

Figure 8:
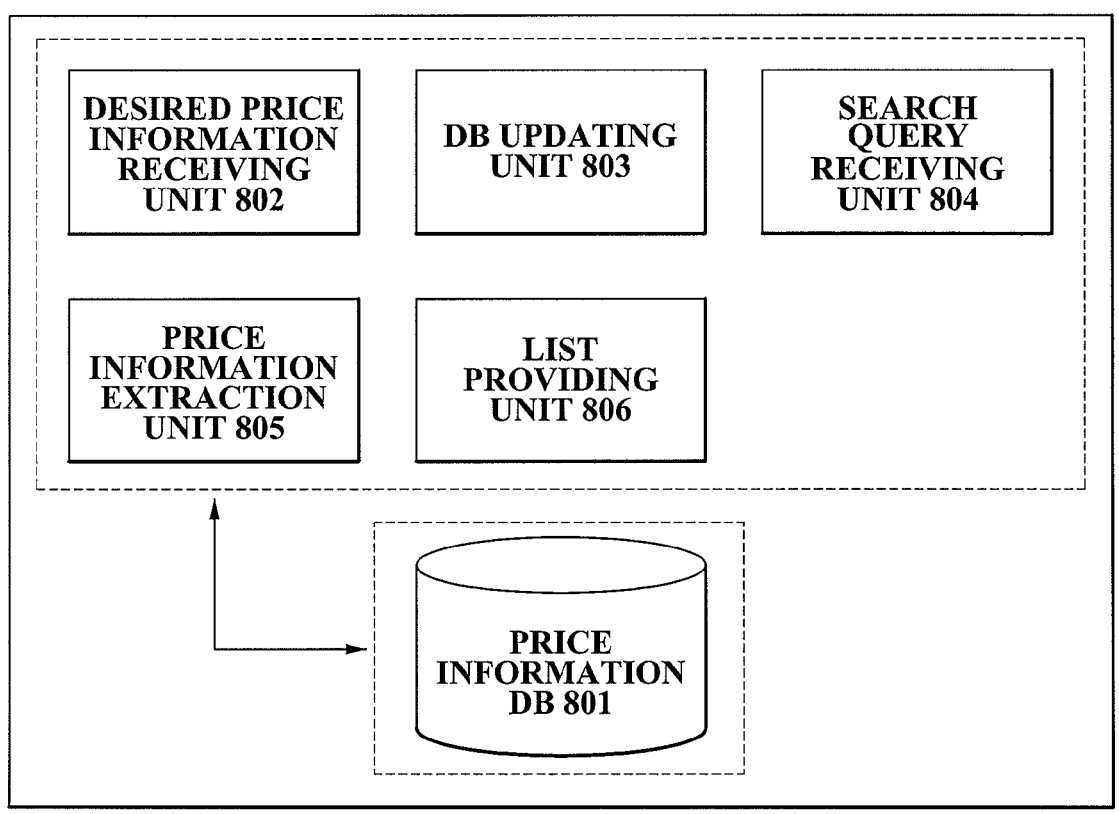
FIG. 8 is a diagram illustrating an internal configuration of a system according to another embodiment of the present invention.

FIG. 8 is a diagram illustrating an internal configuration of a system according to another embodiment of the present invention. As shown in FIG. 8, a unit 800 according to the present embodiment includes a price information database 801, a desired price information receiving unit 802, a database updating unit 803, a search query receiving unit 804, a price information extraction unit 805 and a list providing unit 806. The price information database 801 stores or records user information associated with a user, a product identifier, and desired price information. The user information may include a user identifier and either a mobile phone number or an electronic mail address associated with the user identifier.

The desired price information receiving unit 802 receives a selection of a product and the desired price information associated with the product from the user. When the user desires to purchase the product, the user may input a product identifier of the goods and his/her desired price information. The database updating unit 803 records the product identifier and the desired price information of the product in the price information database 801, in association with the user information of the user. The search query receiving unit 804 receives a search query including a product identifier of a product from a predetermined seller. The seller may input model information of the product, i.e. a model identifier, as a search query using a terminal.

The price information extraction unit 805 extracts the user information and the desired price information associated with the received product identifier in the search query receiving unit 804, by referring to the price information database 801.

The list providing unit 806 makes a list including the extracted user information and desired price information and provides the seller with the list. In this instance, the list may include at least one user information and desired price information of the user who has inputted the product identifier associated with the search query received from a seller. Also, the list may be provided via a webpage, an email or an SMS.

The method according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

According to an embodiment of the present invention, there is provided a method and a system which can record desired price information for predetermined goods from a user, receive selling price information of the goods from a predetermined goods selling system and when the selling price information is lower than the desired price information or when the selling price information is updated to be lower, notify the user of the event. Also, according to an embodiment of the present invention, there is provided a method and a system which can provide a user with goods information being sold at a price associated with the user's desired price information, so that the user may purchase the goods at the user's desired price.

Also, according to an embodiment of the present invention, there is provided a method and a system which can provide a user with goods price information via a short message service (SMS), an electronic mail, a messenger, and a note, and thus, help the user to easily check the goods price information. Also, according to an embodiment of the present invention, there is provided a method and a system which can perform a mailing format conversion with respect to the webpage and thus, help the goods price information to be easily provided for the user, when providing a user with selling price information of a seller which is provided on a predetermined webpage. Also, according to an embodiment of the present invention, there is provided a method and a system which can help a seller to easily find a consumer by providing the seller with user information and the user's desired price information.

What is claimed is:

1. A computer implemented method of running an on-line shopping mall service on one or more servers, the method comprising:

transmitting, to a terminal associated with a user, at least one price of a product available from at least one retailer registered with the on-line shopping mall service;

receiving, at the one or more servers of the on-line shopping mall service, a desired price of the product from the terminal;

arranging, at the one or more servers, the received desired price from the terminal relative to other desired prices received from other terminals for the same product;

sending, from the one or more servers, information indicating the arrangement of desired prices to at least one retailer registered with the on-line shopping mall service;

subsequent to sending, obtaining, at the one or more servers, an updated price of the product from a first retailer registered with the on-line shopping mall service, wherein the updated price is selected by the at least one retailer based on the arrangement of desired prices sent from the one or more servers to the at least one retailer;

comparing, at the one or more servers, the updated price of the first retailer against the desired price so as to determine if the updated price is equal to or lower than the desired price; and upon determining that the updated price is equal to or lower than the desired price, sending, from the one or more servers, a notification to the user that the product is available via the on-line shopping mall service at a price equal to or lower than the desired price with the updated price.

2. The method of claim 1, further comprising:

prior to transmitting, receiving, at the one or more servers, a request from the terminal of the user for providing sales information of the product available in the on-line shopping mall; and prior to transmitting, searching, by the one or more servers, for sales information of the product available in the on-line shopping mall.

3. The method of claim 1, further comprising transmitting, from the one or more servers, sales information of the product in addition to the at least one price of the product, wherein the sales information is selected from the group consisting of a brand name of the product, a picture of the product and an online store selling the product.

4. The method of claim 1, wherein the notification, from the one or more servers, provides a link configured to open a web page of the first retailer.

5. The method of claim 1, wherein the notification, from the one or more servers, is sent to an email address of the user.

6. The method of claim 1, wherein the notification, from the one or more servers, is sent to a mobile telephone of the user.

7. The method of claim 1, wherein obtaining, by the one or more servers, comprises:

sending, from the one or mores servers, a request for an updated price of the product to at least one retailer registered with the on-line shopping mall service; and receiving, from the one or more servers, the updated price from the first retailer.

8. The method of claim 1, wherein obtaining, by the one or more servers, comprises retrieving, by the one or more servers, a price of the product from the web page of the first retailer.

9. The method of claim 1, wherein the on-line shopping mall service comprises a shopping web page served by the one or more servers comprising at least one link configured to open at least one on-line store registered with the on-line shopping mall.

10. A computer-implemented method for processing to purchase a product from an on-line shopping mall service provided by one or more servers, the method comprising:

searching, using a user terminal, for a desired product in an on-line shopping mall service;

receiving, from the one or more servers of the on-line shopping mall service, at least one price of the product available from at least one retailer registered with the on-line shopping mall;

submitting, to the one or more servers of the on-line shopping mall service, a users desired price of the product to be sent to the at least one retailer;

receiving, from the one or more servers of the on-line shopping mall service, a notification notifying the user that the-at least one retailer has provided an updated price in response to the user's desired price, wherein the updated price has been determined by the one or more servers to be equal to or lower than the user's desired price, and wherein the updated price is selected based on an arrangement of the user's desired price relative to other desired prices for the same product received from other users; and submitting, to the one or more servers of the on-line shopping mall service, a request to purchase the desired product from the retailer at the updated price that is equal to or lower than the user's desired price.

11. The method of claim 10, wherein the notification, from the one or more servers, further provides a link configured to open the web page of the at least one retailer who has provided the updated price of the product.

12. The method of claim 10, wherein the notification, from the one or more servers, provides the updated price that is equal to or lower than the desired price.

13. The method of claim 10, wherein receiving the notification, from the one or more servers, is by at least one of an email or a text message to a mobile phone of the user.

* * * * *